United States Patent [19]

Bacskai

[11] 4,138,546

[45] Feb. 6, 1979

[54] CATALYST PREPARATION FOR THE POLYMERIZATION OF PYRROLIDONE

[75] Inventor: Robert Bacskai, Kensington, Calif.

[73] Assignee: Chevron Research Company, San Francisco, Calif.

[21] Appl. No.: 856,824

[22] Filed: Dec. 2, 1977

Related U.S. Application Data

[62] Division of Ser. No. 607,845, Aug. 25, 1975, Pat. No. 4,075,182.

[51] Int. Cl.$^2$ ............................................. C08G 69/24
[52] U.S. Cl. ................................... 528/312; 528/317; 528/326
[58] Field of Search .......... 260/78 P, 78 L, 326.5 FL; 252/428, 431 N

[56] References Cited

U.S. PATENT DOCUMENTS

| | | | |
|---|---|---|---|
| 2,638,463 | 5/1953 | Ney et al. | 260/78 P |
| 2,739,959 | 3/1956 | Ney et al. | 260/78 P |
| 2,891,038 | 6/1959 | Barnes et al. | 260/78 P |
| 2,912,415 | 11/1959 | Black et al. | 260/78 P |
| 3,346,566 | 10/1967 | Chiddix et al. | 260/78 P |
| 3,721,652 | 3/1973 | Barnes | 260/78 P |

*Primary Examiner*—Harold D. Anderson
*Attorney, Agent, or Firm*—Dix A. Newell; T. G. DeJonghe; Lawrence S. Squires

[57] ABSTRACT

In the preparation of a catalyst for the alkalinecatalyzed polymerization of pyrrolidone, an alkali metal alkoxide is contacted with excess 2-pyrrolidone and the product alcohol is removed by passing an inert gas through the reaction mixture at high temperatures.

1 Claim, No Drawings

CATALYST PREPARATION FOR THE POLYMERIZATION OF PYRROLIDONE

This is a division of application Ser. No. 607,845, filed August 25, 1975, now U.S. Pat. No. 4,075,182.

BACKGROUND OF THE INVENTION

Catalyst for the alkaline-catalyzed polymerization of pyrrolidone is usually made by adding an alkali metal hydroxide to excess 2-pyrrolidone. The subsequent reaction produces the alkali metal pyrrolidonate catalyst and water. In order to effectively carry out polymerization, the water should be promptly removed. Its removal is accomplished by heating the mixture at least up to incipient distillation of 2-pyrrolidone (90°–110° C) under reduced pressure (1–10torr). Preferably, an appreciable amount of 2-pyrrolidone is distilled out to ensure substantially anhydrous polymerization conditions (see U.S. Pat. No. 3,721,652).

The catalyst may also be prepared by contacting an alkali metal alkoxide with excess 2-pyrrolidone and distilling off the product alcohol. For example, 2-pyrrolidone is contacted with the alkali metal alkoxide in excess alcohol and then the alcohol is distilled off under reduced pressure (see U.S. Pat. No. 2,727,017); however, this produces poor-quality (low-assay) sodium pyrrolidonate (see U.S. Pat. No. 3,346,566). More efficiently, the alcohol is removed by adding an inert liquid, such as benzene, which forms an azeotrope with the alcohol and then performing an azeotropic distillation.

2-pyrrolidone is completely miscible with water and alcohol, and these solvents are not easily removed from pyrrolidone. Consequently, azeotropic distillation and/or distillation under vacuum have heretofore been used to remove the alcohol or water which is a by-product of catalyst preparation. However, these distillation methods are inefficiently adapted to large-scale production of catalyst.

SUMMARY OF THE INVENTION

The process of preparing catalyst for the polymerization of pyrrolidone comprises contacting a $C_1$-$C_2$ alkali metal alkoxide with an excess of 2-pyrrolidone to form a pyrrolidone solution comprising the catalyst and a $C_1$-$C_2$ alcohol. An inert gas is passed through the solution at a temperature of about 90° C to about 200° C. Unexpectedly, sufficient alcohol is removed from the catalyst solution by the inert gas treatment to permit substantial polymerization of monomer with this catalyst. Distillation is thus not required.

DETAILED DESCRIPTION OF PREFERRED EMBODIMENTS

The process of the present invention is adapted for the in situ preparation of catalyst for the polymerization of pyrrolidone. A $C_1$-$C_2$ alkali metal alkoxide, e.g., lithium, sodium or potassium methoxide or ethoxide, is mixed with an excess amount of purified 2-pyrrolidone which is to be polymerized.

Usually 0.5–30 mol percent, based on 2-pyrrolidone, of the alkoxide is added to pyrrolidone, preferably about 5-20 mol percent and most preferably about 10 mol percent. Preferably a sodium or potassium alkoxide is used, preferably a methoxide, and most preferably sodium methoxide. The reaction between the alkoxide and 2-pyrrolidone yields the catalyst, an alkali metal pyrrolidonate, and the corresponding alcohol, methyl or ethyl alcohol.

The alcohol must be substantially removed before polymerization will proceed with satisfactory conversion. Unexpectedly, it is found that by passing an inert gas through the solution at a temperature from about 90° C to about 200° C, preferably about 100°–150° C, for a period of about 0.1 to about 2 hours, or longer, depending on the rate of flow of the gas and degree of diffusion of the gas through the solution, one is able to remove sufficient alcohol from the solution to obtain good conversion in the subsequent polymerization reaction. Polymerization then proceeds by adding an effective, but small amount of a polymerization activator, such as an N-acyl pyrrolidone, $CO_2$, $SO_2$, etc., and heating at about 15°–100° C, preferably about 25°–70° C, and most preferably 40°–60° C, at subatmospheric to superatmospheric pressures for about 4–100 hours, preferably 8–72 hours and most preferably 8–48 hours, under substantially anhydrous conditions. Usually about 0.01–5 mol percent, based on total 2-pyrrolidone, of the polymerization activator is used. The preferred amounts of $CO_2$ and/or $SO_2$, preferably $CO_2$, range from about 1 mol percent to about 5 mol percent, preferably about 3 mol percent, based on total 2-pyrrolidone.

Suitable inert gases for the process of the present invention include helium, argon, and other rare gases, nitrogen, and even dry air. Of course, the less-expensive gases are preferred. In a preferred process the inert gas after passing through the hot pyrrolidone solution is circulated through cooling coils, or the like, to condense out the alcohol and provide for its recovery.

In order to produce high-quality poly-2-pyrrolidone capable of being formed into fibers, filaments and yarn of commercial textile quality, it is necessary that the 2-pyrrolidone monomer be of high purity. Depending upon the process of manufacture, commercially available 2-pyrrolidone may contain appreciable amounts of various impurities, some of which are believed to interfere deleteriously with polymerization. Purification of the monomer to polymerization grade is achieved by crystallization, distillation, distillation from boron oxide, etc., as disclosed in the literature.

The process of the present invention is just as applicable to the production of polymers of C-alkyl-substituted pyrrolidone, such as 4-methyl-2-pyrrolidone, and copolymers of 2-pyrrolidone, such as with caprolactam, as to the production of poly-2-pyrrolidone. Consequently, in general and unless otherwise indicated, the words "monomer" and "2-pyrrolidone" are interchangeable, and "monomer" denotes 2-pyrrolidone, substituted 2-pyrrolidone, and any compound capable of copolymerizing with 2-pyrrolidone under the stated conditions of alkaline polymerization catalysis.

Preparation of polymers of 2-pyrrolidone, according to the novel process of this invention, can be carried out with various amounts of monomers, catalysts, inert nonsolvent liquids as in dispersion polymerization, initiators, activators and other additives — the amount of each being properly coordinated to produce the most effect polymerization.

Although the preferred amounts of the components of the reaction have been given, it is to be understood that these are not intended to be limitations to polymerization, since it may be possible to effect substantial polymerization outside the preferred ranges.

EXEMPLIFICATION

EXAMPLE

A 500-ml 3-necked flask equipped with a magnetic stirring bar and a gas inlet tube was connected through a Claisen distillation head and water condenser to a receiving flask and two dry-ice-cooled traps. The flask was charged with 50 g of 2-pyrrolidone and 3.18 g of sodium methoxide. Applying a vigorous air stream, the flask was heated to 100° C. The temperature inside the flask was maintained at 100° C for 60 minutes, in which time 1.89 g of liquid collected in the dry-ice traps. This liquid was identified, by vapor-phase chromatography, as methyl alcohol. The reaction mixture was cooled to 30° C, and after removal of the dry-ice traps about 3 mol percent $CO_2$, based on total 2-pyrrolidone, was added through a calibrated vacuum system. The contents of the flask were poured into a polyethylene bottle and heated at 50° C for 22 hours. After the usual grinding and washing with water, the poly-2-pyrrolidone was isolated in an amount corresponding to 42% conversion of monomer. The Gardner viscosity of the nylon 4 was Q-R. This example corresponds to experiment 3 in the following table.

In comparative experiments, the following results were obtained:

| Ex. No. | Temp., °C | Time, min. | Inert gas | Polymer Properties | |
|---|---|---|---|---|---|
| | | | | % Conversion | Viscosity |
| 1 | 100 | 30 | $N_2$ | 22 | B-C |
| 2 | 100 | 60 | $N_2$ | 42 | J-K |
| 3 | 100 | 60 | Air | 42 | Q-R |
| 4 | 130 | 30 | $N_2$ | 39 | U-V |
| 5 | 130 | 30 | None | 5 | <A |
| 6 | 130 | 30 | None | 12 | <A |
| 7 | 120 | 30 | $N_2$ | 40 | T-U |
| 8 | 100 | 60 | $N_2$ | 0 | — |
| 9 | 110 | — | — | 46 | X-Y |

In the comparative experiments all polymerizations except experiment 8 used catalyst system made up from 10 mol percent of sodium methoxide and about 3 mol percent of carbon dioxide, based on total 2-pyrrolidone, and were carried out at 50° C for 22 hours. Experiment 8 differed only in the use of KOH instead of sodium methoxide. In experiments 6 and 7, a small amount of benzene (10 g) was added to the pyrrolidone before catalyst preparation in order to form the benzenealcohol azeotrope. Experiment 9 illustrates the use of vacuum distillation in the preparation of the catalyst, a process which is avoided in the present invention. In experiment 9 the catalyst/2-pyrrolidone/alcohol mixture was heated to incipient distillation of 2-pyrrolidone under a reduced pressure of 2.5 torr at a temperature of 110° C.

Comparison of experiments 1–4 with experiment 5 illustrates the effectiveness of the present process.

Experiments 1 and 2 show the effect of time and experiments 1 and 4 show the effects of temperature in the removal of alcohol in the catalyst preparation and subsequent polymerization.

Experiments 2 and 3 show the equivalence of nitrogen and air.

Comparison of experiments 1–4 with experiment 9 shows that essentially equivalent results are obtained by the present process and by the high vacuum distillation.

Comparison of experiments 4, 6 and 7 shows that the addition of a small amount of benzene to form the lower-boiling benzene-alcohol azeotrope as in experiments 6 and 7 has no appreciable effect on the process of the present invention.

Experiment 8, which utilized potassium hydroxide as the source of catalyst and therefore generated the by-product water, shows that the new process is not effective for removing water.

Polymer viscosity is measured at room temperature (about 25° C) on the Gardner Viscosity Scale using a Gardner-Holdt Bubble Viscometer. 0.5 g of polymer is dissolved in 10 ml of concentrated formic acid (90% by weight HCOOH, 10% water). The polymer solution is compared in viscosity to the Gardner Bubble Standards, e.g., Standard U corresponds to 6.27 stokes, Standard Z corresponds to 22.7 stokes ("Physical and Chemical Examination, Paints, Varnishes, Lacquers and Colors" by H. A. Gardner and G. G. Sward, 12th Ed., 1962, distributed by Gardner Laboratory Company, Inc., Bethesda, Maryland).

What is claimed is:

1. A process for preparing a catalyst-activator system for the polymerization of 2-pyrrolidone comprising the steps of contacting a $C_1$-$C_2$ alkali metal alkoxide with an excess of 2-pyrrolidone to form a 2-pyrrolidone solution comprising the alkali metal pyrrolidonate catalyst and a $C_1$-$C_2$ alcohol, passing an inert gas through said solution at a temperature of about 90° C. to about 200° C. to remove said alcohol, and contacting said solution with carbon dioxide, as an activator, to form said catalyst-activator system.

* * * * *